US012562875B2

(12) United States Patent
Bhamri et al.

(10) Patent No.: US 12,562,875 B2
(45) Date of Patent: Feb. 24, 2026

(54) MULTIPLEXING PATTERN DETERMINATION BASED ON SUBCARRIER SPACING VALUES

(71) Applicant: Lenovo (Singapore) PTE. LTD., New Tech Park (SG)

(72) Inventors: Ankit Bhamri, Rödermark (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 17/906,156

(22) PCT Filed: Mar. 11, 2021

(86) PCT No.: PCT/IB2021/052009
§ 371 (c)(1),
(2) Date: Sep. 12, 2022

(87) PCT Pub. No.: WO2021/181312
PCT Pub. Date: Sep. 16, 2021

(65) Prior Publication Data
US 2023/0179383 A1      Jun. 8, 2023

Related U.S. Application Data

(60) Provisional application No. 62/988,136, filed on Mar. 11, 2020.

(51) Int. Cl.
H04L 5/00          (2006.01)
(52) U.S. Cl.
CPC .......... H04L 5/0092 (2013.01); H04L 5/0051 (2013.01)

(58) Field of Classification Search
CPC ... H04L 5/0092; H04L 5/0051; H04L 5/0007; H04L 27/26025; H04L 27/2613
See application file for complete search history.

(56) References Cited

U.S. PATENT DOCUMENTS

2016/0112171 A1* 4/2016 Sorrentino ............ H04L 5/0037
370/329
2018/0124815 A1* 5/2018 Papasakellariou ...........................
H04W 72/0446
(Continued)

FOREIGN PATENT DOCUMENTS

WO      WO-2018064608 A1 * 4/2018 ....... H04L 27/26025

OTHER PUBLICATIONS

PCT/IB2021/052009, "Notification of Transmittal of the International Search Report and the Written Opinion of the International Searching authority, or the Declaration", International Searching Authority, Aug. 16, 2021, pp. 1-19.
(Continued)

*Primary Examiner* — Yu-Wen Chang
(74) *Attorney, Agent, or Firm* — Kunzler Needham & Hilton

(57)          ABSTRACT
Apparatuses, methods, and systems are disclosed for multiplexing pattern determination based on subcarrier spacing values. One method (900) includes receiving (902) an indication of a first subcarrier spacing value. The method (900) includes receiving (904) a configuration for a demodulation reference signal. The method (900) includes determining (906) a multiplexing pattern for the demodulation reference signal and/or a number of demodulation reference signal ports for the demodulation reference signal by comparing the first subcarrier spacing value with a second subcarrier spacing value.

15 Claims, 7 Drawing Sheets

900

(56) References Cited

U.S. PATENT DOCUMENTS

| | | | |
|---|---|---|---|
| 2018/0278395 A1 | 9/2018 | Yoon | |
| 2019/0007152 A1* | 1/2019 | Yi | H04L 27/26 |
| 2019/0268089 A1* | 8/2019 | Fu | H04W 72/23 |
| 2019/0296877 A1 | 9/2019 | Zhang et al. | |
| 2020/0328861 A1* | 10/2020 | Malladi | H04L 5/0069 |
| 2021/0127376 A1* | 4/2021 | Zeng | H04W 72/20 |
| 2021/0135922 A1* | 5/2021 | Gao | H04L 5/0023 |
| 2021/0352698 A1* | 11/2021 | Zewail | H04L 5/0091 |
| 2022/0022238 A1* | 1/2022 | Chen | H04B 7/0689 |
| 2022/0086782 A1* | 3/2022 | Chen | H04L 5/001 |
| 2022/0158792 A1* | 5/2022 | Liu | H04L 5/0048 |
| 2023/0291531 A1* | 9/2023 | Kim | H04L 5/0091 |

OTHER PUBLICATIONS

ITL, Remaining details on DL DMRS for NR, 3GPP TSG RAN WG1 Meeting #90-bis R1-1718525, Oct. 9-13, 2017, p. 1-6.

Qualcomm, New WID on Extending current NR operation to 71 Ghz, 3GPP TSG RAN Meeting #86 RP-193229, Dec. 9-12, 2019, p. 1-5.

3GPP, 3rd Generation Partnership Project; Technical Specification Group Radio Access Network; NR; Physical channels and modulation (Release 16); 3GPP TS 38.211 V16.0.0, Dec. 2019, p. 1-129.

Intel Corporation, New SID: Study on supporting NR from 52.6Ghz to 71 Ghz, 3GPP TSG RAN Meeting #86 RP-193259, Dec. 9-12, 2019, p. 1-3.

* cited by examiner

200

300

400

| SCS (kHz) | Reference Signal Type | Length in time domain | Time domain multiplexing type | Max # of ports | Frequency domain multiplexing type | Frequency Overhead/pattern |
|---|---|---|---|---|---|---|
| 120 | DM-RS Type1 | 1 symbol | - | 4 | FD-OCC | Every 2nd RE |
| | | 2 symbols | TD-OCC | 8 | FD-OCC | Every 2nd RE |
| | DM-RS Type 2 | 1 symbol | - | 6 | FD-OCC | Every 3rd RE |
| | | 2 symbols | TD-OCC | 12 | FD-OCC | Every 3rd RE |
| 480 | DM-RS Type1 | 1 symbol | - | 2 | FD Combs | Every 2nd RE |
| | | 2 symbols | TD-OCC | 4 | FD Combs | Every 2nd RE |
| | DM-RS Type 2 | 1 symbol | - | 3 | FD Combs | Every 3rd RE |
| | | 2 symbols | TD-OCC | 6 | FD Combs | Every 3rd RE |
| 960 | DM-RS Type1 | 1 symbol | - | 2 | FD Combs | Every 2nd RE |
| | | 2 symbols | TD-OCC | 4 | FD Combs | Every 2nd RE |
| | DM-RS Type 2 | 1 symbol | - | 3 | FD Combs | Every 3rd RE |
| | | 2 symbols | TD-OCC | 6 | FD Combs | Every 3rd RE |

FIG. 4

500

| SCS (KHz) | Reference Signal Type | Max # of ports | Multiplexing Type | Frequency Overhead/Pattern | Time Overhead/Pattern |
|---|---|---|---|---|---|
| 480 | PTRS | 4 | FD-OCC | Every 2nd RE | Configured/indicated separately |
| 960 | PTRS | 2 | FDM combs | Every 4th RE | Every 2nd symbol |
| 1920 | PTRS | 1 | FDM/TDM scattered * | Every 8th RE | Every 2nd symbol |

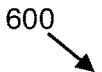

| F | SCS (KHz) | BWP Size | MCS | Waveform |
|---|---|---|---|---|
| 0 | 480 | 100 MHz | 64QAM | CP-OFDM |
| 0 | 480 | 100 MHz | 128QAM | DFT-s-OFDM |
| 1 | 480 | 100 MHz | 256QAM | CP-OFDM |
| 2 | 960 | 200 MHz | 512QAM | DFT-s-OFDM |

| F | Reference Signal Type | Max # of ports | Multiplexing Type | Frequency Overhead/Pattern | Time Overhead/Pattern |
|---|---|---|---|---|---|
| 0 | DM-RS | 4 | FD-OCC | Pair of 2 REs every 4th RE | Every 4th symbol |
| 1 | DM-RS | 4 | FD-OCC | Pair of 2 REs every 4th RE | Every 2nd symbol |
| 2 | DM-RS | 2 | FDM | One RE every 4th RE | Every time symbol |

| F | Reference Signal Type | Max # of ports | Multiplexing Type | Frequency Overhead/Pattern | Time Overhead/Pattern |
|---|---|---|---|---|---|
| 0 | PTRS | 4 | FD-OCC | Pair of 2 REs every 4th RE | Every 4th symbol |
| 1 | PTRS | 4 | FD-OCC | Pair of 2 REs every 4th RE | Every 2nd symbol |
| 2 | PTRS | 2 | FDM | One RE every 4th RE | Every time symbol |

MULTIPLEXING PATTERN DETERMINATION BASED ON SUBCARRIER SPACING VALUES

CROSS-REFERENCE TO RELATED APPLICATIONS

This application claims priority to U.S. Patent Application Ser. No. 62/988,136 entitled "APPARATUSES, METHODS, AND SYSTEMS FOR REFERENCE SIGNAL CONFIGURATIONS FOR CHANNEL ESTIMATION AND PHASE TRACKING FOR HIGHER SUBCARRIER SPACING" and filed on Mar. 11, 2020 for Ankit Bhamri, which is incorporated herein by reference in its entirety.

FIELD

The subject matter disclosed herein relates generally to wireless communications and more particularly relates to multiplexing pattern determination based on subcarrier spacing values.

BACKGROUND

In certain wireless communications networks, changes in subcarrier spacing may impact design and/or performance of transmissions. For example, changes in subcarrier spacing may impact demodulation reference signals and/or phase tracking reference signals.

BRIEF SUMMARY

Methods for multiplexing pattern determination based on subcarrier spacing values are disclosed. Apparatuses and systems also perform the functions of the methods. One embodiment of a method includes receiving an indication of a first subcarrier spacing value. In some embodiments, the method includes receiving a configuration for a demodulation reference signal. In certain embodiments, the method includes determining a multiplexing pattern for the demodulation reference signal and/or a number of demodulation reference signal ports for the demodulation reference signal by comparing the first subcarrier spacing value with a second subcarrier spacing value.

One apparatus for multiplexing pattern determination based on subcarrier spacing values includes a receiver that: receives an indication of a first subcarrier spacing value; and receives a configuration for a demodulation reference signal. In various embodiments, the apparatus includes a processor that determines a multiplexing pattern for the demodulation reference signal and/or a number of demodulation reference signal ports for the demodulation reference signal by comparing the first subcarrier spacing value with a second subcarrier spacing value.

Another embodiment of a method for multiplexing pattern determination based on subcarrier spacing values includes receiving an indication of a first subcarrier spacing value. In some embodiments, the method includes receiving a configuration for a demodulation reference signal. In certain embodiments, the method includes determining a frequency domain multiplexing pattern for phase tracking reference signals by comparing the first subcarrier spacing value of with a second subcarrier spacing value.

Another apparatus for multiplexing pattern determination based on subcarrier spacing values includes a receiver that: receives an indication of a first subcarrier spacing value; and receives a configuration for a demodulation reference signal.

In various embodiments, the apparatus includes a processor that determines a frequency domain multiplexing pattern for phase tracking reference signals by comparing the first subcarrier spacing value of with a second subcarrier spacing value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of reference signals as a function of SCS;

FIG. 5 is a diagram illustrating another embodiment of reference signals as a function of SCS;

FIG. 6 is a diagram illustrating one embodiment of a function F value determination;

FIG. 7 is a diagram illustrating one embodiment of reference signals as a function of F;

FIG. 8 is a diagram illustrating another embodiment of reference signals as a function of F;

DETAILED DESCRIPTION

Figure 1:
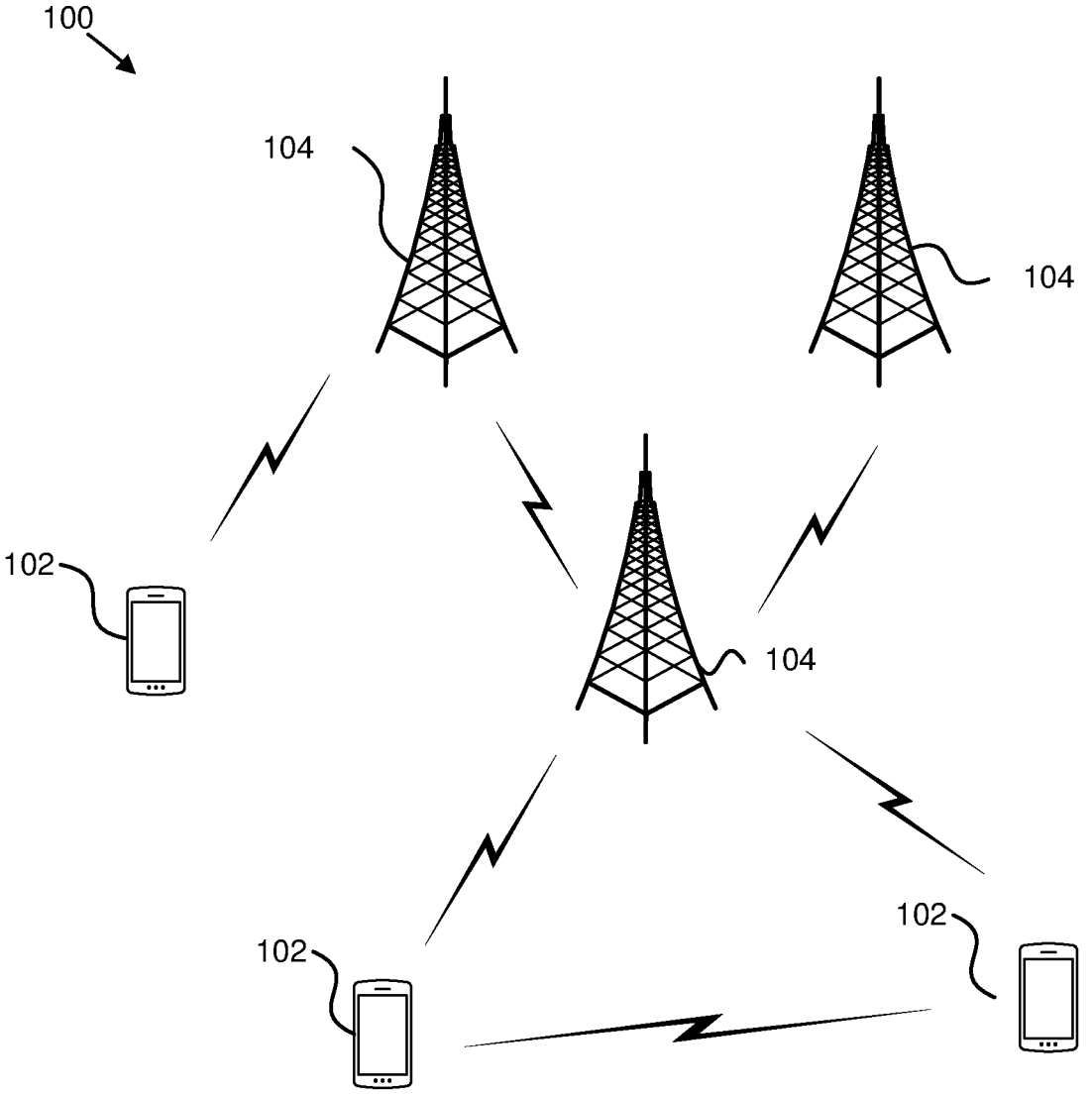
FIG. 1 is a schematic block diagram illustrating one embodiment of a wireless communication system for multiplexing pattern determination based on subcarrier spacing values.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiplexing pattern determination based on subcarrier spacing values. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive an indication of a first subcarrier spacing value. In some embodiments, the remote unit 102 may receive a configuration for a demodulation reference signal. In certain embodiments, the remote unit 102 may determine a multiplexing pattern for the demodulation reference signal and/or a number of demodulation reference signal ports for the demodulation reference signal by comparing the first subcarrier spacing value with a second subcarrier spacing value. Accordingly, the remote unit 102 may be used for multiplexing pattern determination based on subcarrier spacing values.

In certain embodiments, a remote unit 102 may receive an indication of a first subcarrier spacing value. In some embodiments, the remote unit 102 may receive a configuration for a demodulation reference signal. In certain embodiments, the remote unit 102 may determine a frequency domain multiplexing pattern for phase tracking reference signals by comparing the first subcarrier spacing value of with a second subcarrier spacing value. Accordingly, the remote unit 102 may be used for multiplexing pattern determination based on subcarrier spacing values.

Figure 2:
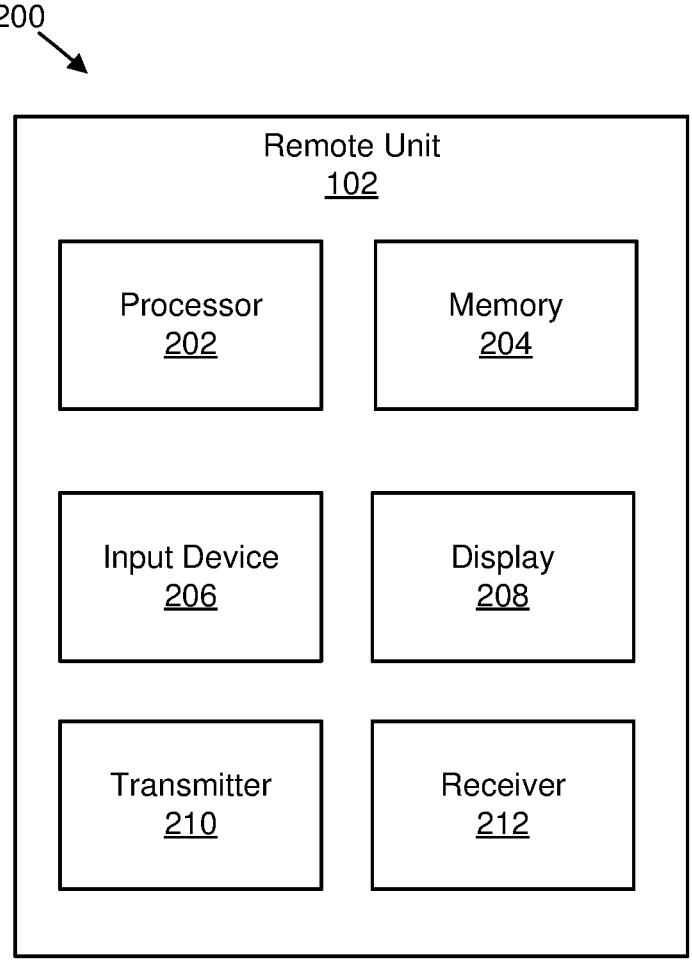
FIG. 2 is a schematic block diagram illustrating one embodiment of an apparatus that may be used for multiplexing pattern determination based on subcarrier spacing values.

FIG. 2 depicts one embodiment of an apparatus 200 that may be used for multiplexing pattern determination based on subcarrier spacing values. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212: receives an indication of a first subcarrier spacing value; and receives a configuration for a demodulation reference signal. In various embodiments, the processor 202 determines a multiplexing pattern for the demodulation reference signal and/or a number of demodulation reference signal ports for the demodulation reference signal by comparing the first subcarrier spacing value with a second subcarrier spacing value.

In certain embodiments, the receiver 212: receives an indication of a first subcarrier spacing value; and receives a configuration for a demodulation reference signal. In various embodiments, the processor 202 determines a frequency domain multiplexing pattern for phase tracking reference signals by comparing the first subcarrier spacing value of with a second subcarrier spacing value.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
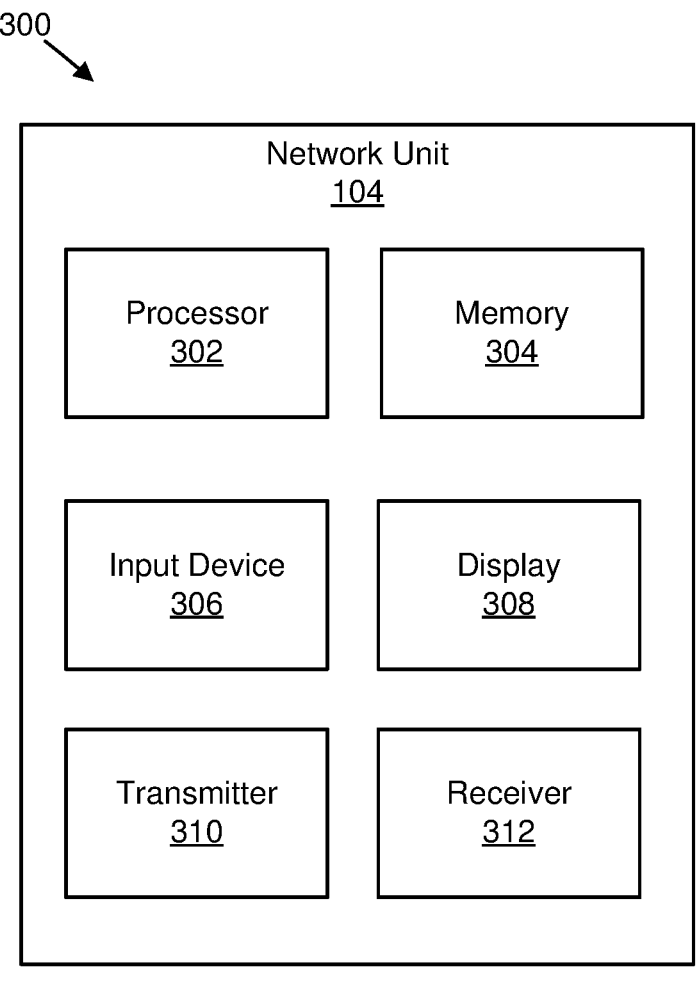
FIG. 3 is a schematic block diagram illustrating one embodiment of an apparatus that may be used for multiplexing pattern determination based on subcarrier spacing values.

FIG. 3 depicts one embodiment of an apparatus 300 that may be used for multiplexing pattern determination based on subcarrier spacing values. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, there may be an impact on a configuration, an activation, and/or an indication of demodulation reference signals ("DM-RS") ("DMRS") and/or phase tracking reference signals ("PT-RS") ("PTRS") due to higher sub-carrier spacing ("SCS"). In such embodiments, there may be specific configurations used based on the requirements of SCS and corresponding bandwidths for DMRS and/or PTRS.

In some embodiments, a reduced capacity reference signal design (e.g., in terms of a number of ports, overhead for channel estimation, phase noise tracking, and/or Doppler estimation) may be configured and/or used. In such embodiments, a value of subcarrier spacing may be above a predetermined threshold. In various embodiments, a number of ports and/or overhead for reference signals may be a function of one or more parameters (e.g., SCS value). In certain embodiments, a reference signal design may use a common signal for both DM-RS and PT-RS. In some embodiments, there may be a different signal design used for DM-RS and PT-RS. In such embodiments, there may be a one-to-one association (e.g., a number of ports for DM-RS and PT-RS may be the same). In some embodiments, an overhead of a reference signal may be implied based on a parameter or a combination of parameters (e.g., carrier frequency, SCS, BWP size, modulation and coding scheme ("MCS"), and waveform type).

In various embodiments found herein, benefits may include exploiting highly directional beams in higher frequencies with high SCS by configuring, indicating, and/or activating a number of ports for a reference signal as an explicit and/or implicit function of at least the SCS. In such embodiments, for high frequency transmission, a performance gain of high rank may be limited.

In a first embodiment, a table may be configured and/or transmitted to a user equipment ("UE") by a network to determine a set of parameters for reference signal transmission and/or reception for DL and/or UL. In such an embodiment, a reference signal is used for DM-RS and/or PT-RS (e.g., used for channel estimation, phase noise tracking, and/or other purposes such as channel measurement). For different SCS values, individual sets of values may be configured.

FIG. 4 is a diagram 400 illustrating one embodiment of reference signals as a function of SCS. The diagram 400 is just one example for determining different patterns. Exact values and/or parameters are not limited to the diagram 400. For example, FIG. 5 is a diagram 500 illustrating another embodiment of reference signals as a function of SCS.

In one implementation of the first embodiment, a time overhead and/or pattern may be configured separately as a function of MCS, but with increased SCS values.

In another implementation of the first embodiment, different parameters of the reference signal and their values may not be a direction function of SCS, but may be a function of one or more additional parameters such as carrier frequency, SCS, bandwidth part ("BWP") size, MCS, and/or waveform type. Examples of such implementations are illustrated in FIG. 6, FIG. 7, and FIG. 8. Specifically, FIG. 6 is a diagram 600 illustrating one embodiment of a function F value determination, FIG. 7 is a diagram illustrating one embodiment of reference signals as a function of F, and FIG. 8 is a diagram illustrating another embodiment of reference signals as a function of F.

In some embodiments, DM-RS and PT-RS configurations are separately determined based on a direct function of SCS or as a function as a combination of several parameters (e.g., function F). In such embodiments, either a DM-RS configuration or a PT-RS configuration may be determined and if any of these reference signals is not determined as a function of SCS or F, then another procedure may be used to determine their configuration.

In certain embodiments, parameters of DM-RS may be determined as a sub-set of existing configuration types for DM-RS. In one example, a maximum number of ports for DM-RS type 1 may be limited to a lower value such as 2 for 1-symbol length DMRS and 4 for 2-symbol length DMRS if an SCS value is high, such as 480 kHz or 960 kHz. In such an example, other factors for DM-RS transmission and/or reception may be implicitly determined using existing configurations. For example, if a maximum number of ports for DM-RS configuration type 1 are more than 2 and up to 4, then only 2-symbol DM-RS may be used (e.g., single-symbol DMRS may not be used). In another example, a maximum number of ports for DM-RS type 2 may be limited to a lower value such as 3 for 1-symbol length DMRS and 6 for 2-symbol length DMRS if an SCS value is high, such as 480 kHz or 960 kHz. In such an example, other factors for DM-RS transmission and/or reception may be implicitly determined using existing configurations. For example, if a maximum number of ports for DM-RS configuration type 1 are more than 3 and up to 6, then only 2-symbol DM-RS may be used (e.g., single-symbol DMRS may not be used).

In various embodiments, a DM-RS port indication field in downlink control information ("DCI") may be disabled dynamically or semi-statically and if the field is disabled, then a UE may assume that a number of ports to be used for transmission and/or reception may be equal to a maximum number of ports allowed. In such embodiments, the UE uses all configured ports and therefore no explicit port indication table is needed. For a high SCS, it may be assumed that a low rank transmission is used, the maximum number of ports are low, and all ports may be used for transmission and/or reception.

In some embodiments, if a DM-RS port indication field in DCI is enabled, then either a sub-set of existing tables may be used, or another implicit determination may be used for port indication.

In certain embodiments, based on various parameters, a quasi-co-location ("QCL") Type may be configured by high layers that indicate a spatial relation between DM-RS and/or PT-RS resources (e.g., DM-RS is QCLed with PT-RS)

Figure 9:
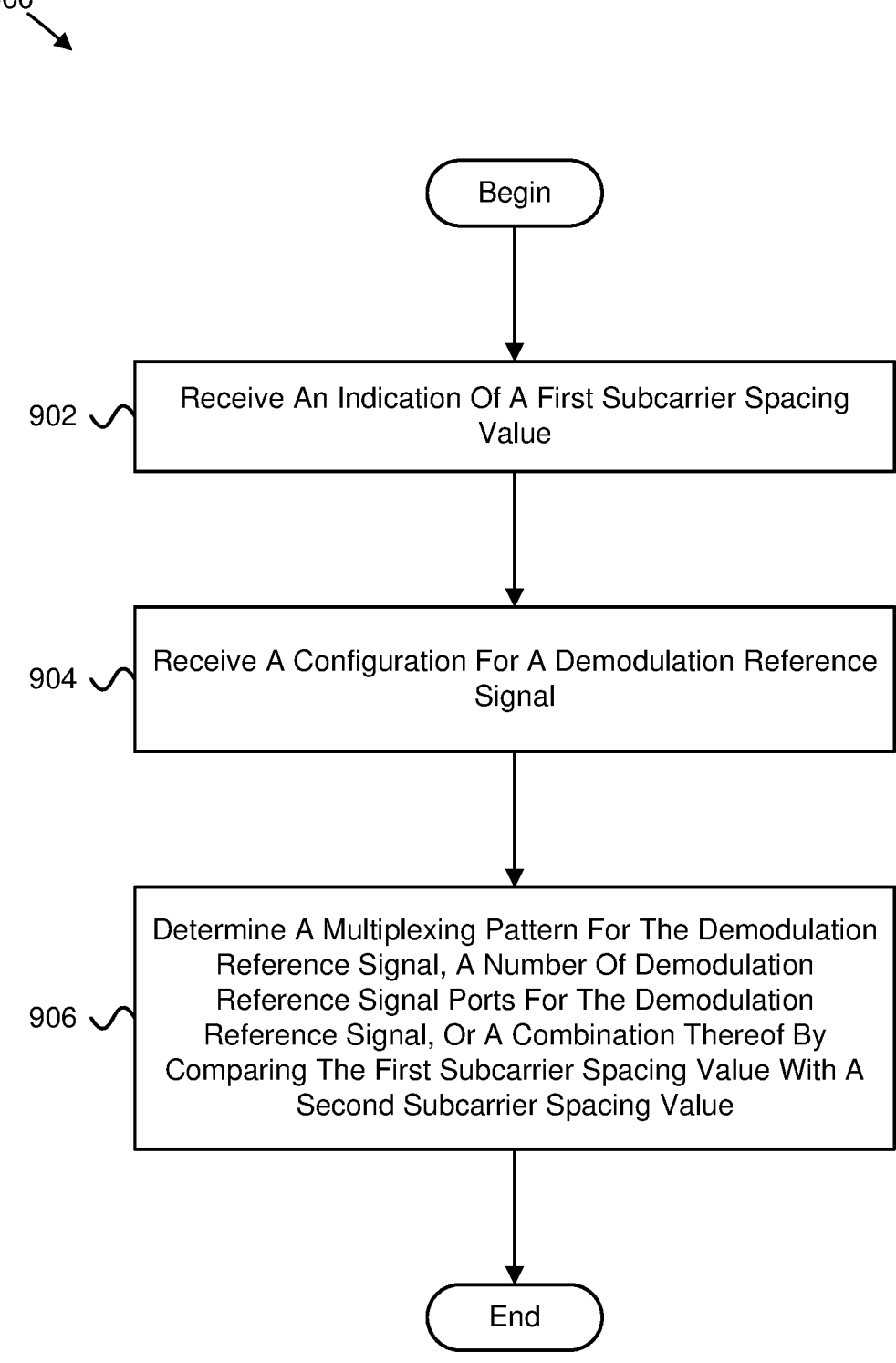
FIG. 9 is a flow chart diagram illustrating one embodiment of a method for multiplexing pattern determination based on subcarrier spacing values.

FIG. 9 is a flow chart diagram illustrating one embodiment of a method 900 for multiplexing pattern determination based on subcarrier spacing values. In some embodiments, the method 900 is performed by an apparatus, such as the remote unit 102 and/or the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 an indication of a first subcarrier spacing value. In some embodiments, the method 900 includes receiving 904 a configuration for a demodulation reference signal. In certain embodiments, the method 900 includes determining 906 a multiplexing pattern for the demodulation reference signal and/or a number of demodulation reference signal ports for the demodulation reference signal by comparing the first subcarrier spacing value with a second subcarrier spacing value.

In certain embodiments, the second subcarrier spacing value is fixed, semi-statically configured, and/or dynamically indicated. In some embodiments, the number of demodulation reference signal ports decreases in response to the first subcarrier spacing value being greater than or equal to the second subcarrier spacing value. In various embodiments, the multiplexing pattern for the demodulation reference signal comprises a frequency domain multiplexing type and/or a time domain multiplexing type.

In one embodiment, the frequency domain multiplexing type comprises only frequency domain multiplexing combs in response to the first subcarrier spacing value being greater than or equal to the second subcarrier spacing value. In certain embodiments, the frequency domain multiplexing type excludes frequency domain orthogonal cover code based multiplexing. In some embodiments, the second subcarrier spacing value comprises 480 kHz and/or 960 kHz.

In various embodiments, the demodulation reference signal pattern comprises parameters determined as a subset of a demodulation reference signal type. In one embodiment, the demodulation reference signal type comprises a type 1 or a type 2. In certain embodiments, the number of demodulation reference signal ports depends on the demodulation reference signal type and is based on an antenna port field indicated in downlink control information.

In some embodiments, the multiplexing pattern depends on the demodulation reference signal type and is based on an antenna port field indicated in downlink control information. In various embodiments, a maximum number of demodulation reference signal ports equals a maximum allowed number of demodulation reference signal ports in response to the first subcarrier spacing value being greater than or equal to the second subcarrier spacing value. In one embodiment, frequency domain orthogonal cover code based multiplexing is not indicated in response to the first subcarrier spacing value being greater than or equal to the second subcarrier spacing value.

Figure 10:
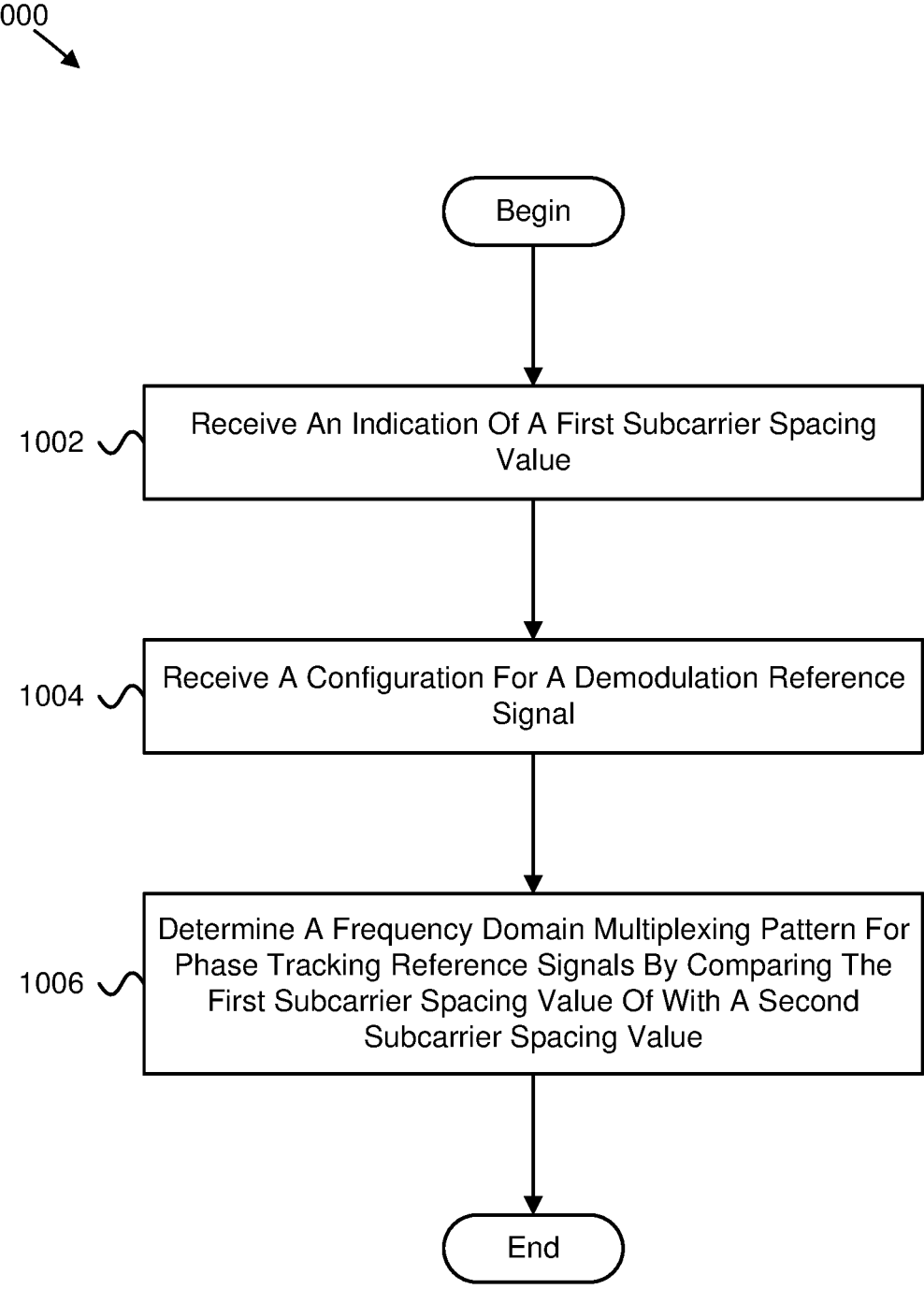
FIG. 10 is a flow chart diagram illustrating another embodiment of a method for multiplexing pattern determination based on subcarrier spacing values.

FIG. 10 is a flow chart diagram illustrating another embodiment of a method 1000 for multiplexing pattern determination based on subcarrier spacing values. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 an indication of a first subcarrier spacing value. In some embodiments, the method 1000 includes receiving 1004 a configuration for a demodulation reference signal. In certain embodiments, the method 1000 includes determining 1006 a frequency domain multiplexing pattern for phase tracking reference signals by comparing the first subcarrier spacing value of with a second subcarrier spacing value.

In certain embodiments, the frequency domain multiplexing pattern for phase tracking reference signal comprises decreasing a gap between phase tracking reference signal subcarriers in response to the first subcarrier spacing value being greater than or equal to the second subcarrier spacing value. In some embodiments, there is no gap between the phase tracking reference signal subcarriers. In various embodiments, the second subcarrier spacing value comprises 480 kHz and/or 960 kHz.

In one embodiment, a method comprises: receiving an indication of a first subcarrier spacing value; receiving a configuration for a demodulation reference signal; and determining a multiplexing pattern for the demodulation reference signal and/or a number of demodulation reference signal ports for the demodulation reference signal by comparing the first subcarrier spacing value with a second subcarrier spacing value.

In certain embodiments, the second subcarrier spacing value is fixed, semi-statically configured, and/or dynamically indicated.

In some embodiments, the number of demodulation reference signal ports decreases in response to the first subcarrier spacing value being greater than or equal to the second subcarrier spacing value.

In various embodiments, the multiplexing pattern for the demodulation reference signal comprises a frequency domain multiplexing type and/or a time domain multiplexing type.

In one embodiment, the frequency domain multiplexing type comprises only frequency domain multiplexing combs in response to the first subcarrier spacing value being greater than or equal to the second subcarrier spacing value.

In certain embodiments, the frequency domain multiplexing type excludes frequency domain orthogonal cover code based multiplexing.

In some embodiments, the second subcarrier spacing value comprises 480 kHz and/or 960 kHz.

In various embodiments, the demodulation reference signal pattern comprises parameters determined as a subset of a demodulation reference signal type.

In one embodiment, the demodulation reference signal type comprises a type 1 or a type 2.

In certain embodiments, the number of demodulation reference signal ports depends on the demodulation reference signal type and is based on an antenna port field indicated in downlink control information.

In some embodiments, the multiplexing pattern depends on the demodulation reference signal type and is based on an antenna port field indicated in downlink control information.

In various embodiments, a maximum number of demodulation reference signal ports equals a maximum allowed number of demodulation reference signal ports in response to the first subcarrier spacing value being greater than or equal to the second subcarrier spacing value.

In one embodiment, frequency domain orthogonal cover code based multiplexing is not indicated in response to the first subcarrier spacing value being greater than or equal to the second subcarrier spacing value.

In one embodiment, an apparatus comprises: a receiver that: receives an indication of a first subcarrier spacing value; and receives a configuration for a demodulation reference signal; and a processor that determines a multiplexing pattern for the demodulation reference signal and/or a number of demodulation reference signal ports for the demodulation reference signal by comparing the first subcarrier spacing value with a second subcarrier spacing value.

In certain embodiments, the second subcarrier spacing value is fixed, semi-statically configured, and/or dynamically indicated.

In some embodiments, the number of demodulation reference signal ports decreases in response to the first subcarrier spacing value being greater than or equal to the second subcarrier spacing value.

In various embodiments, the multiplexing pattern for the demodulation reference signal comprises a frequency domain multiplexing type and/or a time domain multiplexing type.

In one embodiment, the frequency domain multiplexing type comprises only frequency domain multiplexing combs in response to the first subcarrier spacing value being greater than or equal to the second subcarrier spacing value.

In certain embodiments, the frequency domain multiplexing type excludes frequency domain orthogonal cover code based multiplexing.

In some embodiments, the second subcarrier spacing value comprises 480 kHz and/or 960 kHz.

In various embodiments, the demodulation reference signal pattern comprises parameters determined as a subset of a demodulation reference signal type.

In one embodiment, the demodulation reference signal type comprises a type 1 or a type 2.

In certain embodiments, the number of demodulation reference signal ports depends on the demodulation reference signal type and is based on an antenna port field indicated in downlink control information.

In some embodiments, the multiplexing pattern depends on the demodulation reference signal type and is based on an antenna port field indicated in downlink control information.

In various embodiments, a maximum number of demodulation reference signal ports equals a maximum allowed number of demodulation reference signal ports in response to the first subcarrier spacing value being greater than or equal to the second subcarrier spacing value.

In one embodiment, frequency domain orthogonal cover code based multiplexing is not indicated in response to the first subcarrier spacing value being greater than or equal to the second subcarrier spacing value.

In one embodiment, a method comprises: receiving an indication of a first subcarrier spacing value; receiving a configuration for a demodulation reference signal; and determining a frequency domain multiplexing pattern for phase tracking reference signals by comparing the first subcarrier spacing value of with a second subcarrier spacing value.

In certain embodiments, the frequency domain multiplexing pattern for phase tracking reference signal comprises decreasing a gap between phase tracking reference signal subcarriers in response to the first subcarrier spacing value being greater than or equal to the second subcarrier spacing value.

In some embodiments, there is no gap between the phase tracking reference signal subcarriers.

In various embodiments, the second subcarrier spacing value comprises 480 kHz and/or 960 kHz.

In one embodiment, an apparatus comprises: a receiver that: receives an indication of a first subcarrier spacing value; and receives a configuration for a demodulation reference signal; and a processor that determines a frequency domain multiplexing pattern for phase tracking reference signals by comparing the first subcarrier spacing value of with a second subcarrier spacing value.

In certain embodiments, the frequency domain multiplexing pattern for phase tracking reference signal comprises decreasing a gap between phase tracking reference signal subcarriers in response to the first subcarrier spacing value being greater than or equal to the second subcarrier spacing value.

In some embodiments, there is no gap between the phase tracking reference signal subcarriers.

In various embodiments, the second subcarrier spacing value comprises 480 kHz and/or 960 kHz.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving an indication of a first subcarrier spacing value;

receiving a configuration for demodulation reference signal (DMRS) associated with a subcarrier spacing; and determining a number of DMRS ports, by comparing the first subcarrier spacing value with a second subcarrier spacing value comprising one or more of 480 kHz or 960 kHz, wherein one or more of the DMRS ports are associated with different frequency domain orthogonal cover codes (OCC).

2. The method of claim 1, wherein the second subcarrier spacing value is fixed, semi-statically configured, or dynamically indicated, or a combination thereof.

3. The method of claim 1, wherein the number of DMRS ports decreases in response to the first subcarrier spacing value being greater than or equal to the second subcarrier spacing value.

4. The method of claim 1, wherein the frequency domain multiplexing type excludes frequency domain OCC based multiplexing.

5. The method of claim 1, further comprising determining parameters as a subset of a DMRS type.

6. A user equipment (UE), comprising:

at least one memory; and at least one processor coupled with the at least one memory and configured to cause the UE to:

receive an indication of a first subcarrier spacing value;

receive a configuration for demodulation reference signal (DMRS) associated with a subcarrier spacing; and determine a number of DMRS ports, by comparing the first subcarrier spacing value with a second subcarrier spacing value comprising one or more of 480 kHz or 960 kHz, wherein one or more of the DMRS ports are associated with different frequency domain orthogonal cover codes (OCC).

7. The UE of claim 6, wherein the second subcarrier spacing value is fixed, semi-statically configured, or dynamically indicated, or a combination thereof.

8. The UE of claim 6, wherein the number of DMRS ports decreases in response to the first subcarrier spacing value being greater than or equal to the second subcarrier spacing value.

9. The UE of claim 6, wherein the at least one processor is configured to cause the UE to determine parameters as a subset of a DMRS type.

10. The UE of claim 9, wherein the number of DMRS ports depends on the DMRS type and is based on an antenna port field indicated in downlink control information.

11. The UE of claim 9, wherein a maximum number of DMRS ports equals a maximum allowed number of DMRS ports in response to the first subcarrier spacing value being greater than or equal to the second subcarrier spacing value.

12. The UE of claim 6, wherein frequency domain OCC based multiplexing is not indicated in response to the first subcarrier spacing value being greater than or equal to the second subcarrier spacing value.

13. A processor for wireless communication, comprising:

at least one controller coupled with at least one memory and configured to cause the processor to:

receive an indication of a first subcarrier spacing value;

receive a configuration for demodulation reference signal (DMRS) associated with a subcarrier spacing; and determine a number of DMRS ports, by comparing the first subcarrier spacing value with a second subcarrier spacing value comprising one or more of 480 kHz or 960 kHz, wherein one or more of the DMRS ports are associated with different frequency domain orthogonal cover codes (OCC).

14. The processor of claim 13, wherein the second subcarrier spacing value is fixed, semi-statically configured, or dynamically indicated, or a combination thereof.

15. The processor of claim 13, wherein the number of DMRS ports decreases in response to the first subcarrier spacing value being greater than or equal to the second subcarrier spacing value.

* * * * *